United States Patent [19]

Potter

[11] 4,220,064
[45] Sep. 2, 1980

[54] CLAMPING DEVICE
[75] Inventor: Robert Potter, Salem, Ohio
[73] Assignee: Paxson Machine Company, Salem, Ohio
[21] Appl. No.: 13,400
[22] Filed: Feb. 21, 1979
[51] Int. Cl.³ .................. B23D 35/00; B23D 19/06
[52] U.S. Cl. .................................... 83/665; 83/481; 83/664; 83/700; 403/350; 403/367
[58] Field of Search ............... 83/664, 665, 666, 700, 83/481; 403/348, 352, 351, 350, 367, DIG. 8

[56] References Cited
U.S. PATENT DOCUMENTS

| | | |
|---|---|---|
| 1,556,055 | 10/1925 | Weber . |
| 2,239,623 | 4/1941 | Oster ............................. 83/665 |
| 3,645,158 | 2/1972 | Gries ............................. 83/500 X |
| 3,837,265 | 9/1974 | Tokuno ......................... 83/665 X |
| 3,850,069 | 11/1974 | Saunders ....................... 83/665 X |

Primary Examiner—J. M. Meister
Attorney, Agent, or Firm—Meyer, Tilberry & Body

[57] ABSTRACT

A clamping collar is provided to be mounted about a shaft, arbor or the like, which may be secured at any position along the longitudinal axis of the shaft and preferably adjacent to the load on the shaft. The device comprises a pair of interfaced rings concentric about the shaft and arcuately shiftable one with respect to the other to shift locking lugs radially into and out of clamping engagement with the shaft. The device also includes means to make lateral pressure contact with arbor spacing sleeves, washers, spacers or flanges assembled on the shaft to space tool means, or the like, therebetween.

30 Claims, 13 Drawing Figures

CLAMPING DEVICE

Discussion of the Prior Art

In setting up coil slitting arbors for slitting coils of metal strip into predetermined widths, it is customary to locate the slitting blades on the arbors with spacer sleeves which are very accurately machined so that the slitting blades are positioned exactly where necessary to slit the strip into the desired widths. In order to slit strips of various widths, it is necessary to maintain a substantial inventory of spacing sleeves of different incremental lengths to provide the spacings required for different slitting operations. Because spacing sleeves are accurately machined they are quite expensive. An inventory of sufficient sizes of spacing sleeves to provide all necessary spacings between slitting blades represents a considerable capital investment. Additionally, setting up a job using these spacing sleeves is time consuming, involving high labor costs and expensive down time.

So as to avoid the down time while setting up for a slitting operation, turn table type slitter arbors have been developed in which one pair of arbors are being set up while a second pair of arbors are in operation slitting strip. After completion of the first run, the first pair of working arbors are rotated out of position while a second pair of arbors, which have been set up for a second job, are rotated into place. The first set of arbors may then be stripped down or reset for yet another slitting operation. Turn table type slitting stands save down time but do not reduce the set up time required by skilled mechanics.

Objects of the Invention

It is therefore an object of this invention to provide a collar for a shaft or arbor (hereinafter "arbor") which may be positioned and clamped anywhere along the axial span of the arbor, and particularly adjacent the load.

It is another object of this invention to provide a clamping collar for an arbor which eliminates the need for a threaded end nut on the arbor.

It is another object of this invention to provide a clamping collar for an arbor which may be quickly located axially along the span of the arbor by positioning notches or grooves machined on the arbor.

It is another object of this invention to provide means for quickly setting up a coil slitting arbor without need for machine ground spacing sleeves.

It is another object of this invention to provide means for setting up a coil slitting arbor which eliminates the need for an arbor nut to clamp slitting blades and spacers.

It is another object of this invention to provide means for quickly setting up an arbor with coil slitting blades wherein one slit may be made in a strip without use of any spacers.

It is another object of this invention to provide means for setting up an arbor with coil slitting blades wherein a pair of slits may be made in a strip using spacers only between slits.

It is another object of this invention to provide an outboard arbor clamping collar which may be positioned and clamped anywhere on a shaft, and in particular adjacent the load, and which provides clamping means axial to said arbor.

It is another object of this invention to provide an arbor clamping collar provided with an annular piston fluid actuated to provide an axial thrust against a tool or the like mounted on said arbor.

It is another object of this invention to provide an arbor clamping collar provided with a threaded expanding ring to produce lateral thrust against a tool or the like mounted on said arbor.

Other objects of this invention will become apparent to those skilled in the art upon a reading of the following description of the invention.

Brief Description of the Drawings

Preferred embodiments of the invention have been chosen for purposes of illustration and description wherein.

Description of the Preferred Embodiments

The preferred embodiments of the invention discussed hereinbelow are not intended to be representative of all applications of the invention or to limit the invention to the precise forms disclosed. Rather, the embodiments of the invention described have been chosen in order to best explain the principles of the invention, applications and practical uses to enable others skilled in the art to best utilize the invention. However, it is contemplated that there is a broad application for uses of the invention in mechanical arts unrelated to the art of coil slitting, the art for which the invention was initially conceived.

Figure 1:
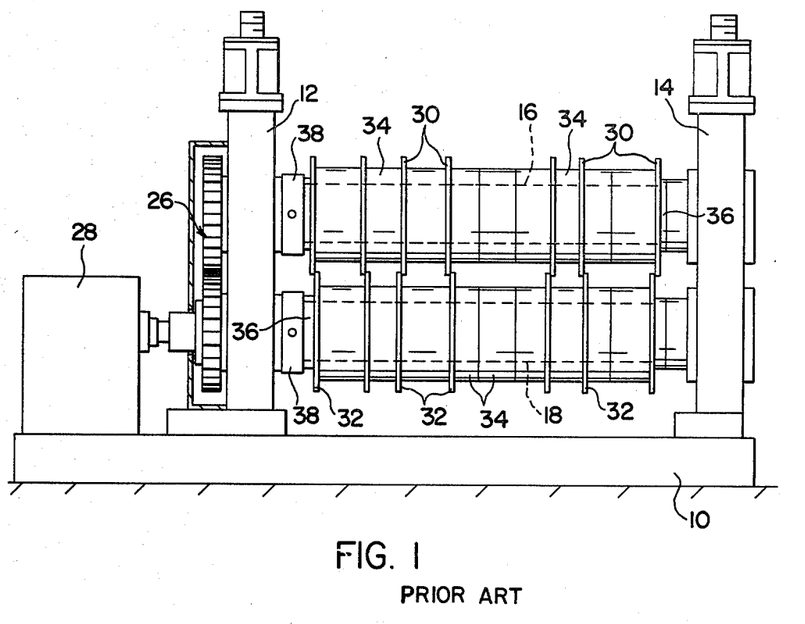
FIG. 1 is an elevational view of a conventional coil slitting stand.
Figure 2:
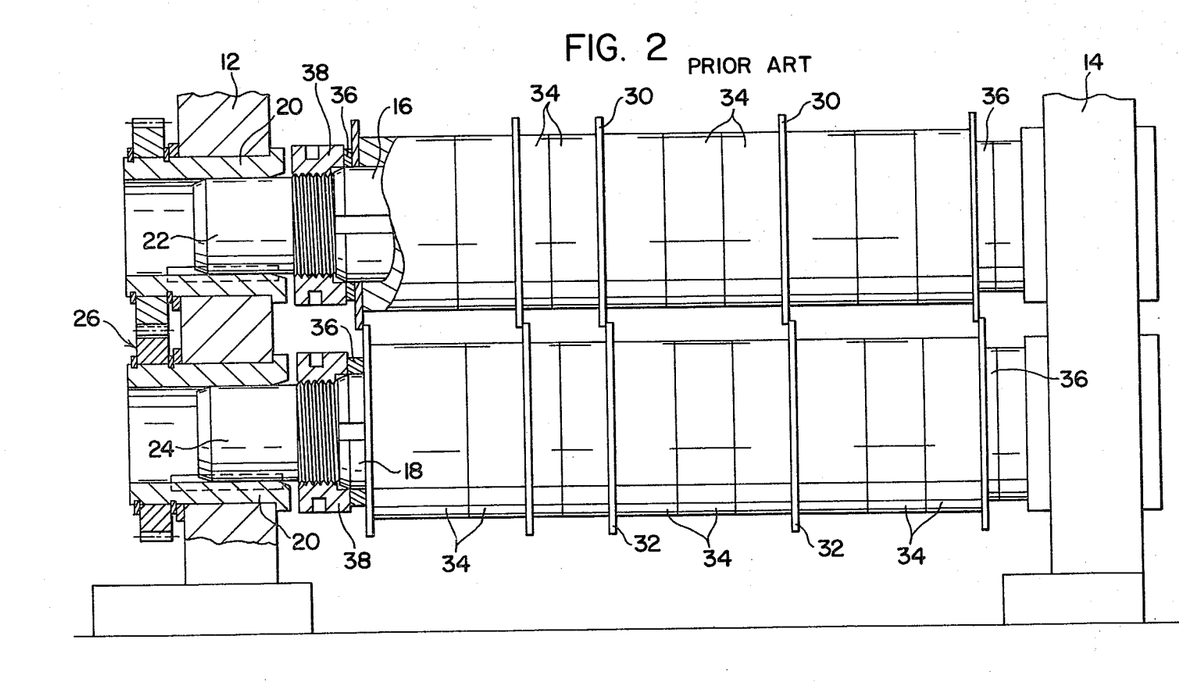
FIG. 2 is a fragmentary elevational view of a conventional coil slitting stand, partly in section, and with arbors withdrawn from the left stand to better show the threaded arbor nuts which lock the coil slitting blades and spacers in place on the arbors.

Referring now to the drawings in greater detail, and first to FIG. 1 of the drawings, therein is disclosed a standard coil slitter stand which includes a base 10 upon which is mounted a pair of arbor journal or chock stands 12 and 14. A pair of arbors 16 and 18 are journaled in stands 12 and 14 in journal bearings 20 such as shown in FIG. 2, wherein the ends 22 and 24 of arbors 16 and 18 are shown in transition either prior or subsequent to engagement with bearings 20. The ends 22 and 24 or arbors 16 and 18 when received in bearings 20 are also drivingly connected to gear means 26 (FIG. 1) which are powered by drive means 28. Mounted on arbors 16 and 18 (FIG. 2) are matching pairs of coil slitting blades 30–32 which are positioned axially on arbors 16 and 18 by spacing sleeves 34. As aforesaid, spacing sleeves 34 are accurately machine ground to precise tolerances and are of varying lengths so that when used in combination they will space slitter blades 30—30 and 32—32 the exact distances apart required to accurately slit metal strip to a desired width. When the slitter blades are properly positioned on the arbors by spacer sleeves 34 the entire assemblage is locked in place by washers 36 and outboard arbor nuts 38. It is to be noted that outboard arbor nuts are threaded onto the ends 22 and 24 of arbors 16 and 18, respectively, and thus have only slight axial adjustment capability.

If it is not required for a particular slitting operation that a plurality of coil slitter blades be positioned across the entire span of arbors 16 and 18 as shown in FIG. 1, it is nevertheless necessary to assemble spacers 34 to fill the entire unoccupied axial span of the arbors between outboard arbor nuts 38 and blades 30' and 32'. Accordingly, irrespective of whether a single pair of blades 30 and 32 or several pairs of blades 30 and 32 are mounted on arbors 16 and 18, it is nevertheless necessary to completely fill all space on the arbor not occupied by slitter blades 30 and 32 with spacer sleeves 34. Thus, the time required of a skilled mechanic to set up a pair of slitting arbors is a considerable cost factor in the process of slitting metal strip.

Figure 3:
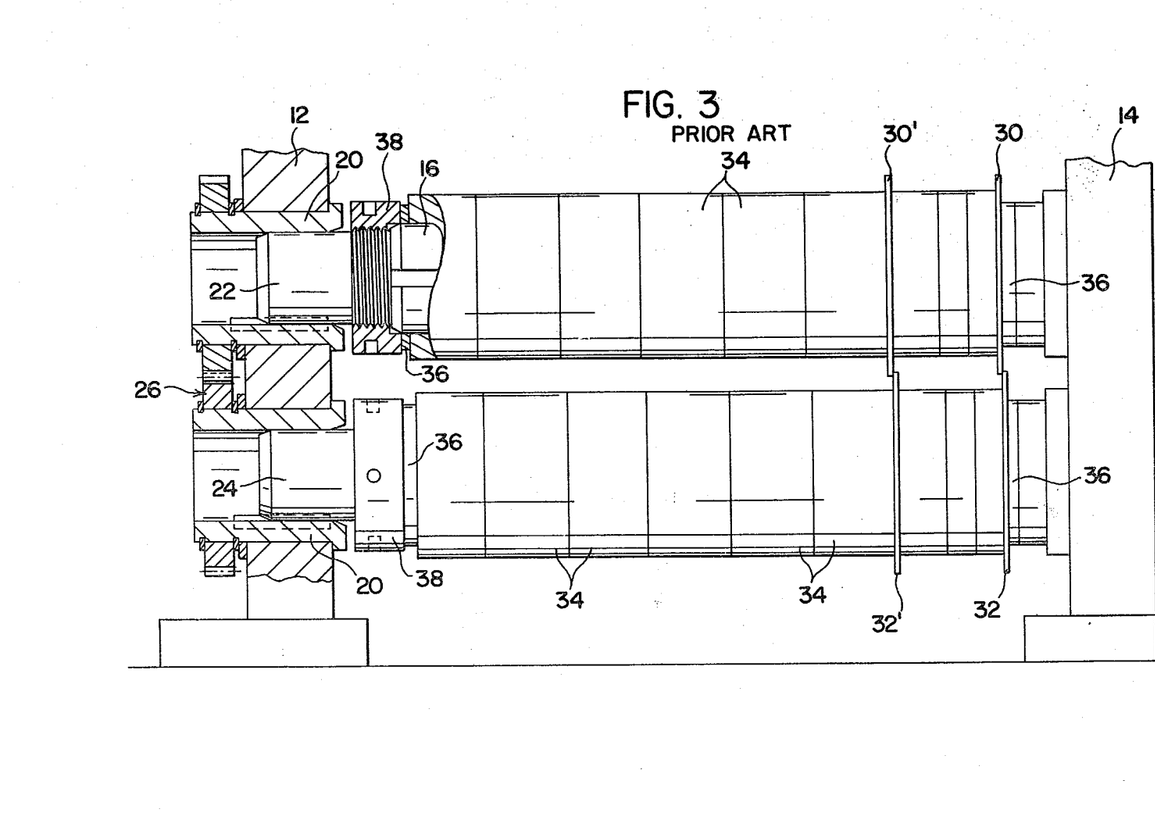
FIG. 3 is an elevational view of a conventional coil slitting stand, partly in section, showing the means for spacing coil slitting blades when only a narrow width is to be slit from the edge of a coil.

To eliminate the high cost of setting up coil slitting arbors in accordance with the prior art method disclosed and described with respect to FIGS. 1 through 3, it is applicant's inventive concept to substantially dispense with expensive time consuming spacer sleeves on coil slitting arbors.

Figure 4:
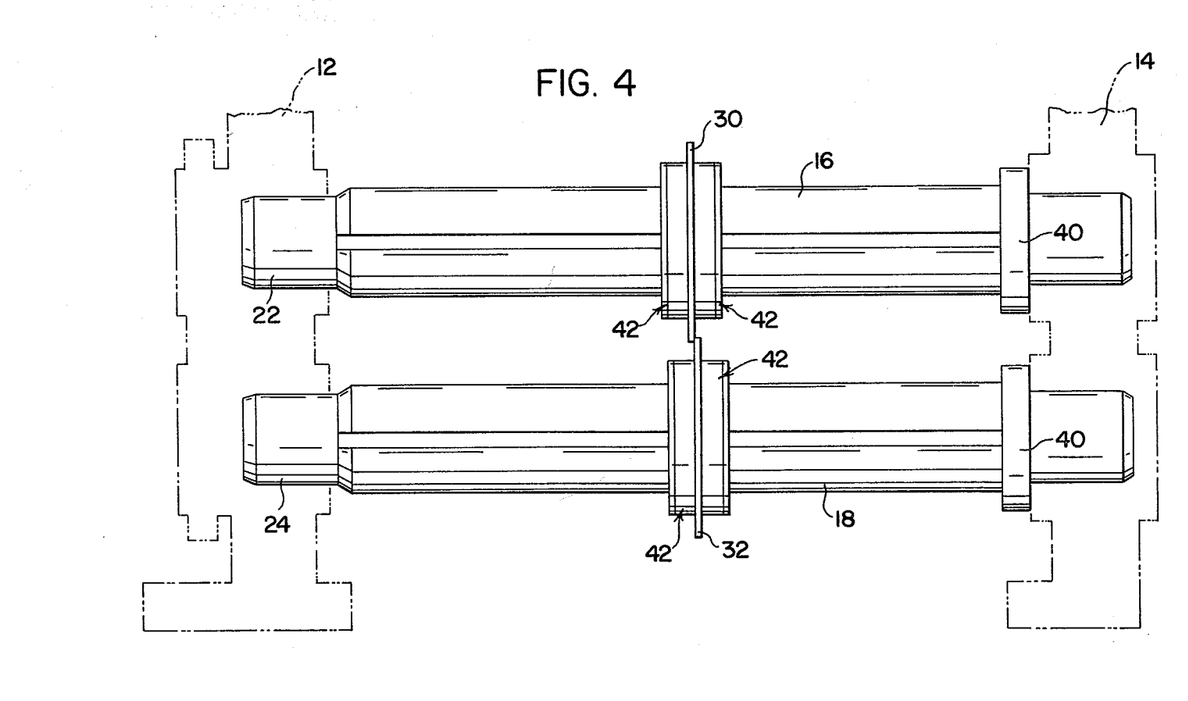
FIG. 4 is an elevational view of a pair of coil slitting arbors showing a preferred embodiment of the invention in combination with a pair of coil slitting blades mounted on a pair of arbors when slitting through the center of the strip.

Referring to FIG. 4, therein is shown a set up in which a pair of cutter blades 30–32 are mounted midpoint on the spans of arbors 16 and 18. In this set up, a pair of clamping collars 42 are mounted precisely at the load on arbor 16 to position upper slitter blade 30. In like manner, a pair of clamping collars 42 are positioned precisely at the load on arbor 18 to locate lower slitter blade 32. It will be noted that no spacers are employed on either side of clamping collars 42 on arbors 16 and 18. Accordingly, as shown in FIG. 4, threaded arbors, outboard arbor washers 36 and nuts 38 are not necessary and have therefore been eliminated from this set up.

Figure 5:
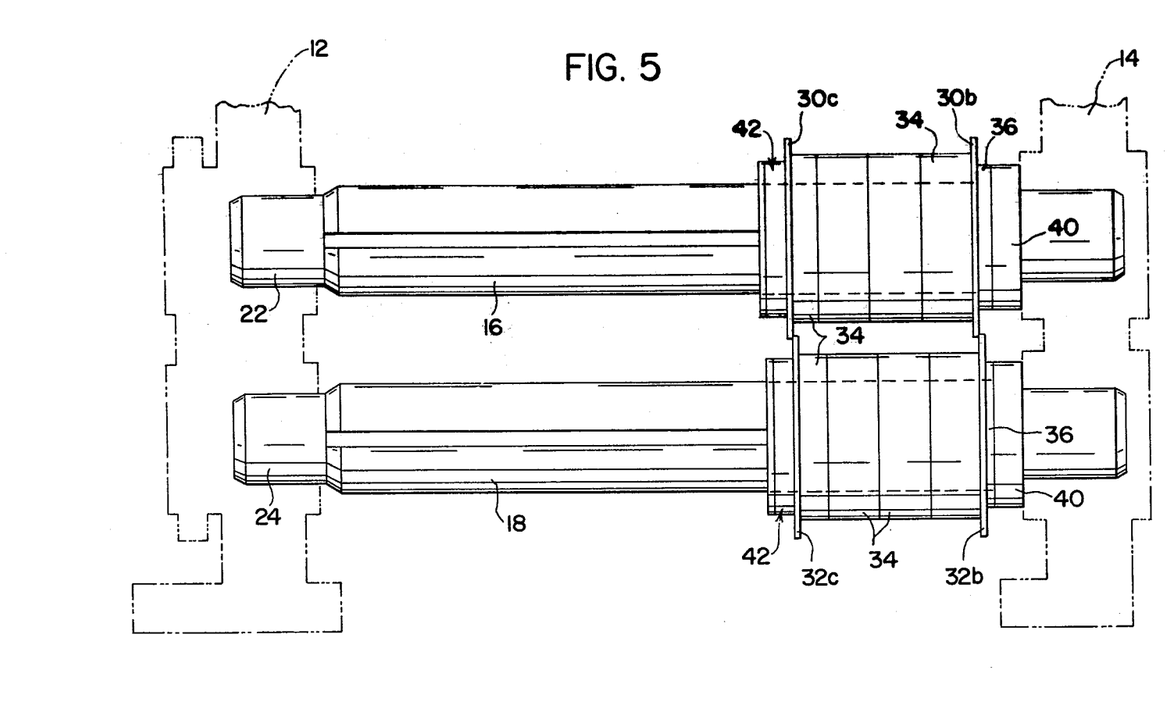
FIG. 5 is an elevational view, partly in section, of a coil slitting stand showing a preferred embodiment of the invention mounted on the arbors of a coil slitting stand in combination with coil slitting blades and spacers when a narrow width is to be slit from the edge of a coil.

Referring now to FIG. 5, therein is shown another application of the subject invention in which a pair of coil slitting blades 30b–32b are set up on the far right ends of arbors 16 and 18, respectively. Blade 30b abuts against washer 36 which is positioned by arbor flange 40. Blade 32b is also positioned by an arbor flange 40. Coil slitter blades 30c–32c are spaced axially apart from blades 30b–32b by conventional spacers 34. In abutting contact with blades 30c–32c are clamping collars 42. It will be observed that no spacing sleeves are used between clamping collars 42 and the left ends 22 and 24 of the arbors 16 and 18, respectively. With this embodiment, outboard washers 36 and arbor nuts 38 are also no longer necessary, and thus have been eliminated in the set up shown in FIG. 5.

Figure 6:
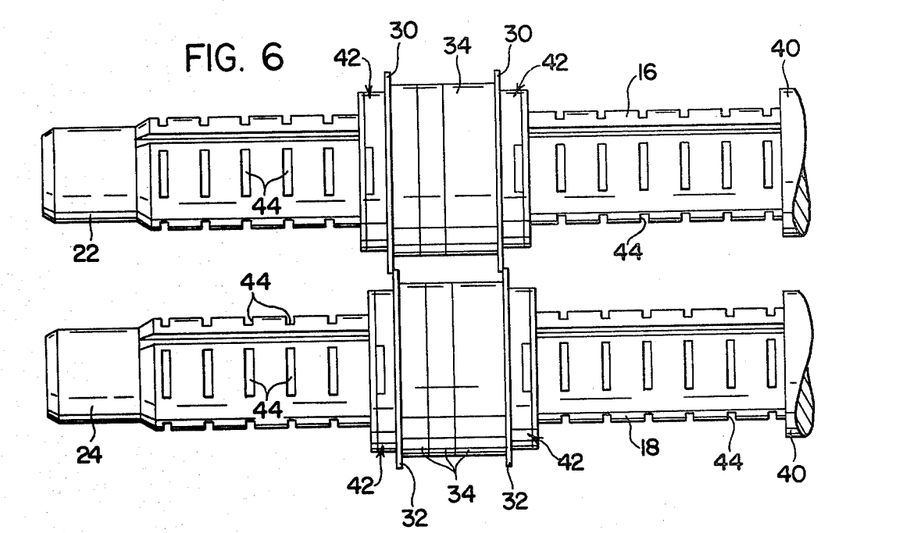
FIG. 6 is an elevational view of a preferred embodiment of the invention showing locating notches or grooves on the arbors of a coil slitter stand.
Figure 6A:
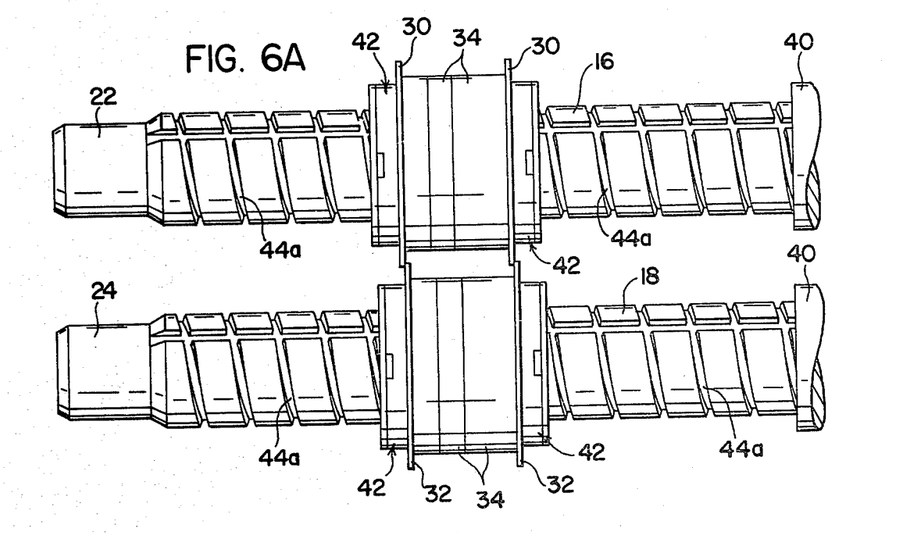
FIG. 6A is an elevational view of one alternative embodiment showing spiral grooves on the arbors.
Figure 10:
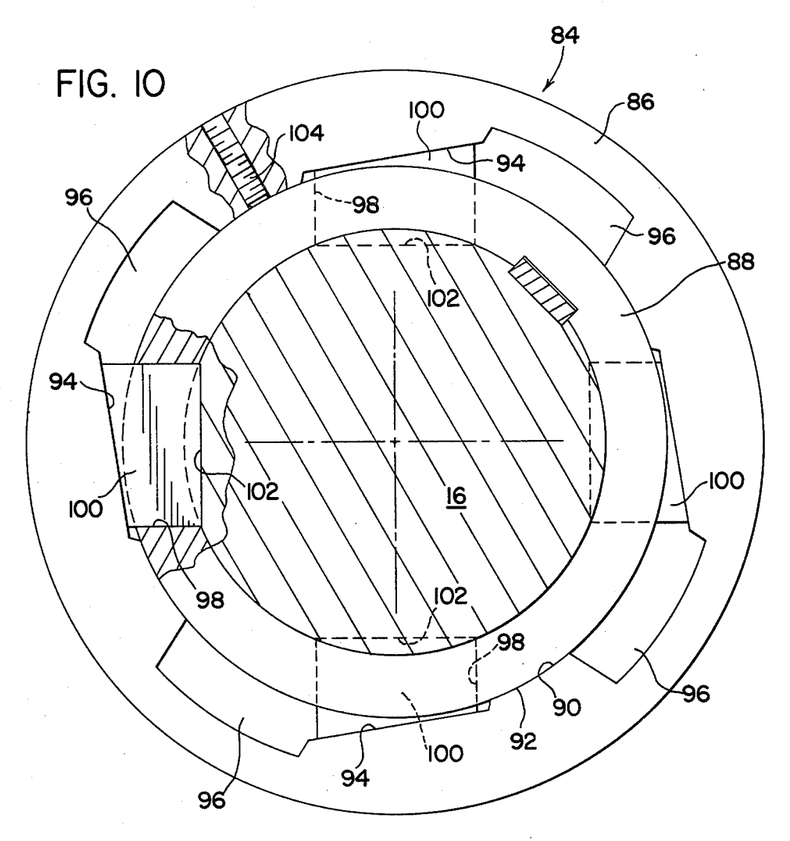
FIG. 10 is an elevational view in section of another embodiment of the invention.

FIG. 6 is illustrative of yet another application of the subject clamping collars wherein pairs of slitting blades 30–32 are mounted on the center spans of arbors 16 and 18 and spaced apart by conventional spacers 34. However, no spacers are employed elsewhere on the arbors 16 and 18. To expedite positive location of clamping collars 42 adjacent the high load positions of arbors 16 and 18, a plurality of flats, notches or grooves 44 may be machined on the surfaces of arbors 16 and 18. Thus, where the same set ups are employed on a regular basis, it may facilitate set up time to have arbor slots machined to positively locate the clamping collars 42 without need for making any other measurements axially along the arbor shafts 16 and 18. In an alternative embodiment, in lieu of rectangular flats or notches 44, spiral grooves 44a may be provided, as shown in FIG. 6A, wherein positioning of clamping collars 42 is unrestricted along the axes of the arbors 16 and 18. In this embodiment, the clamping lugs 60 described with reference to FIGS. 7, 8 and 10 would be modified to engage spiral groove 44a as distinguished from the rectangular lugs shown in FIGS. 7, 8 and 10 for use in rectangular grooves 44. Otherwise the function of the lugs in coaction with grooves 44 or 44a would be substantially the same.

Figure 7:
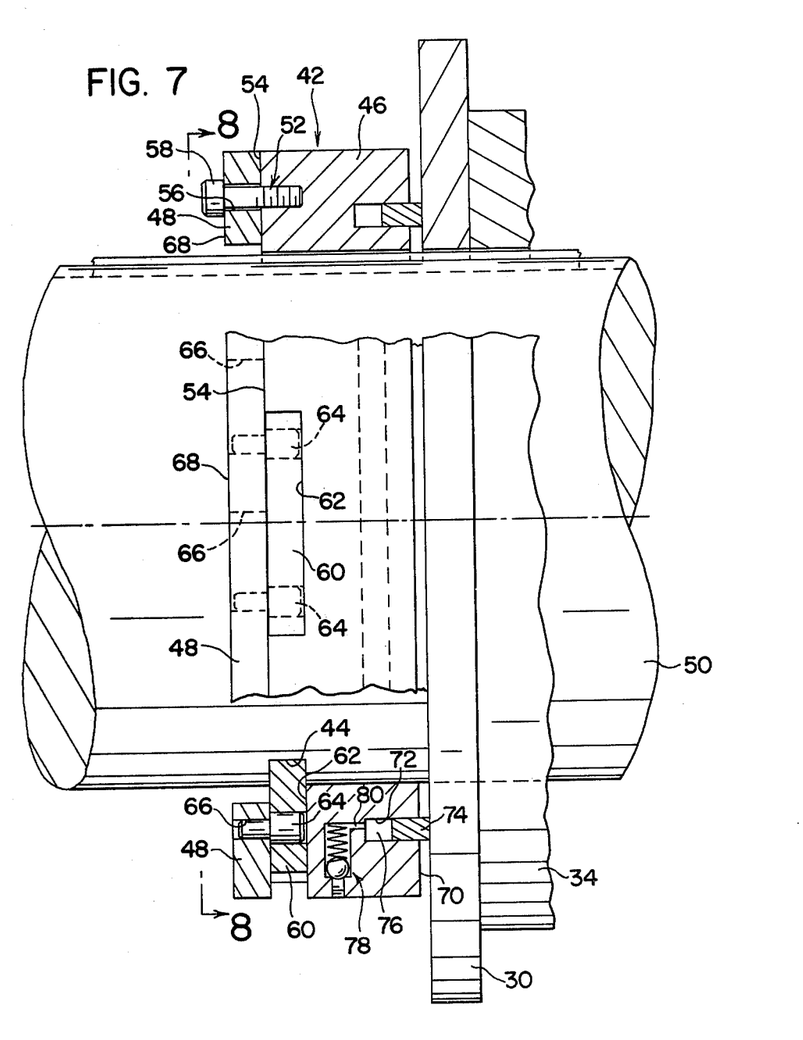
FIG. 7 is a fragmentary elevational view of a preferred embodiment of the invention, partly in section, shown mounted on a coil slitting arbor and taken along the line 7—7 of FIG. 8.
Figure 8:
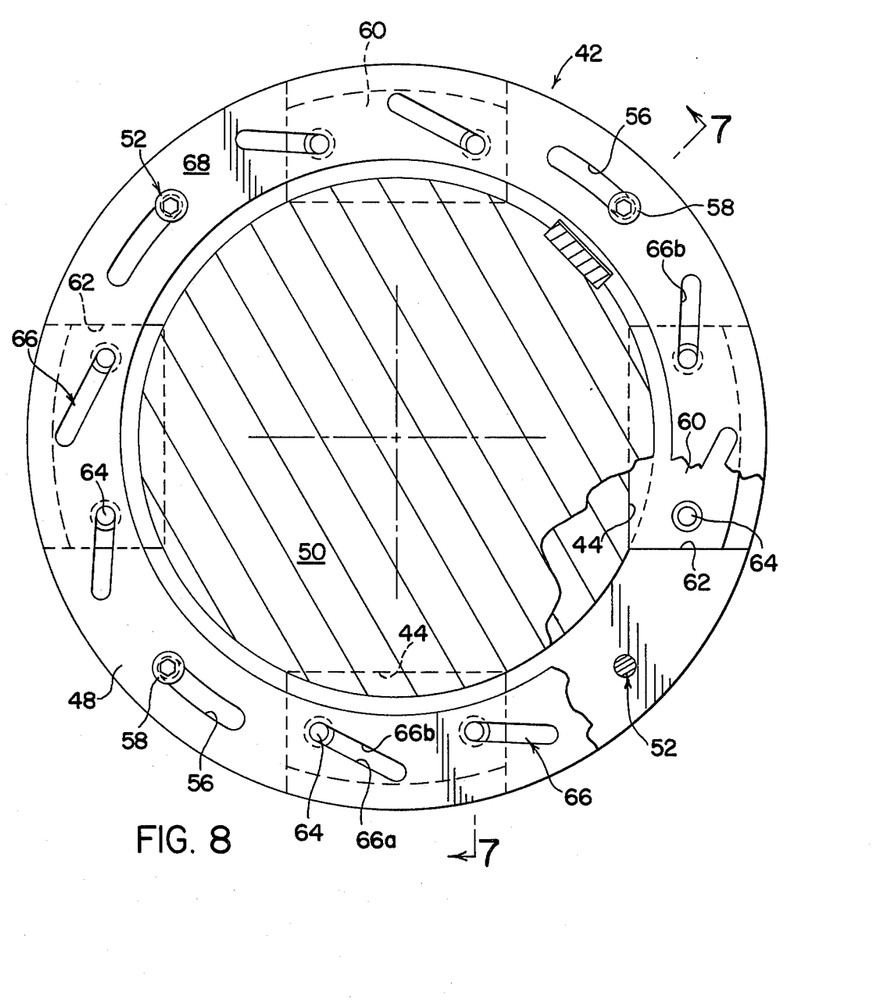
FIG. 8 is a view taken along line 8—8 of FIG. 7.

The preferred embodiment of the invention shown in FIGS. 7 and 8 comprises clamping collar 46 coplanar interfaced with a clamping actuator ring 48 and concentrically mounted about an arbor 50. The means for fastening ring 48 to collar 46 includes a plurality of locking pins 52 secured in face 54 of collar 46 to project axially therefrom. A plurality of arcuate slots 56 are machined in ring 48 concentric about the axis of shaft 50 of sufficient width to receive the free end portions of pins 52 therein. Securable to the free end portions of pins 52 are fastener means 58 provided to prevent ring 48 from disengaging from pins 52. By means of pins 52 and arcuate slots 56 it is possible to arcuately shift ring 48 relative to collar 46 concentrically about shaft 50.

Sandwiched between collar 46 and ring 48 are a plurality of clamping lugs 60 which are housed in open face slots 62 machined in face 54 of collar 46. Clamping lugs 60 are each provided with a pair of cam follower pins 64 which are received in slots 66 of ring 48. Slots 66 are so configured and aligned that upon arcuate shifting of ring 48 relative to collar 46 the slots act as cam surfaces to apply pressure against cam follower pins 64. Cam follower pins 64, in turn, radially shift lugs 60 inwardly or outwardly depending on the direction of arcuate shifting of ring 48. Thus, as shown in FIG. 8, ring 48 has already been arcuately shifted counterclockwise to the extent permitted by the lengths of slots 66. In so shifting ring 48 counterclockwise, cam surfaces 66a and cam follower pins 64 urge lugs 60 radially inwardly into engagement with arbor slots 44 machined on the surface of arbor 50. When arcuately shifted clockwise, cam surfaces 66b apply pressure against cam follower pins 64 to shift lugs 60 radially outwardly from engagement with arbor slots 44. Accordingly, in order to locate clamping collar 42 on an arbor 50, ring 48 is rotated counterclockwise as shown in FIG. 8 until lugs 60 make full locking engagement with slots 44. Fastener means 58 are then placed in pressure contact with face 68 or ring 48 to lock ring 48 against arcuate shifting relative to collar 46. To release the clamping collar 42 from engagement with arbor 50, fastener means 58 are released from clamping engagement with surface 68 of ring 48 to permit arcuate shifting of ring 48 clockwise to back lugs 60 out of clamping engagement with slots 44 of arbor 50.

To more precisely adjust clamping collar 42 relative to an arbor mounted tool such as a slitter blade 30 or 32, axial thrust means are mounted on collar 46. In one preferred embodiment of the invention, the axial thrust means comprise an annular groove 72 machined in the face 70 of collar 46 in which is fitted an annular piston 74. Fluid pressure is admitted into the chamber 76 formed by annular groove 72 and annular piston 74 by any check valve means such as spring loaded ball means 78 and fluid passage 80. When pressure is admitted into chamber 76, annular piston 74 is thrust axially from annular groove 72 into contact with a slitter blade 30 or any intermediate member such as a washer or spacer, as required. This axial thrust mechanism is utilized for fine adjustment in lieu of precision shims, washers, spacers, flanges, sleeves or the like, thereby providing accurate and instant clamping engagement with an arbor tool.

Figure 9:
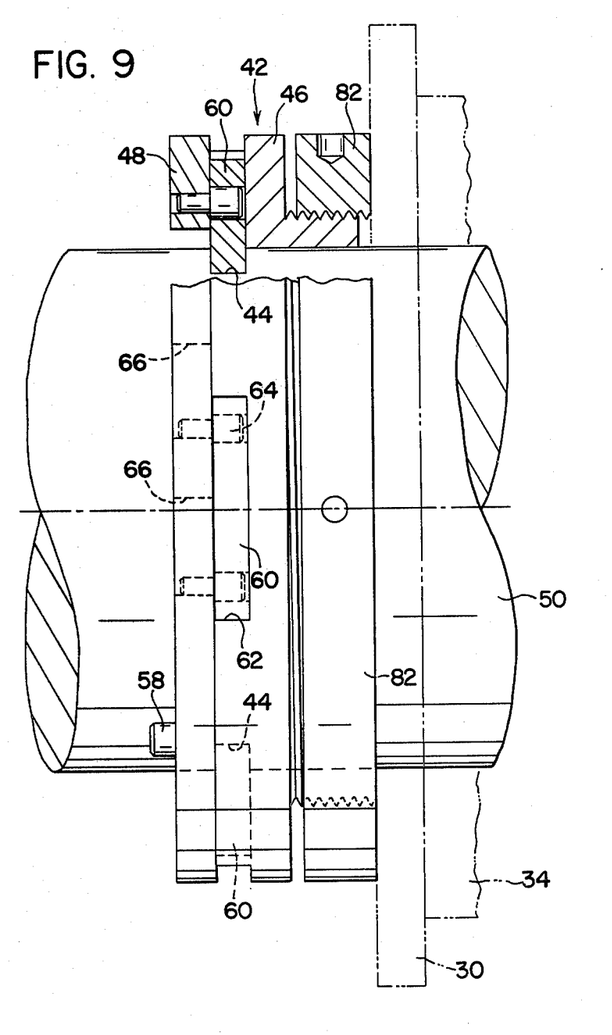
FIG. 9 is a fragmentary elevation view, partly in section, similar to FIG. 7, showing yet another preferred embodiment of the invention.

In another preferred embodiment of the invention, FIG. 9, axial thrust means are provided by a peripheral ring 82 in threaded engagement with collar 46 whereby axial thrust is provided by rotation of ring 82 toward the slitter blade, or the like, to be clamped on the arbor 50. Ring 82 may be rotated into and out of engagement with a workpiece to be clamped on arbor 50 by means of a spanner wrench or other tool means well known in the art for rotating large diameter rings.

Figure 11:
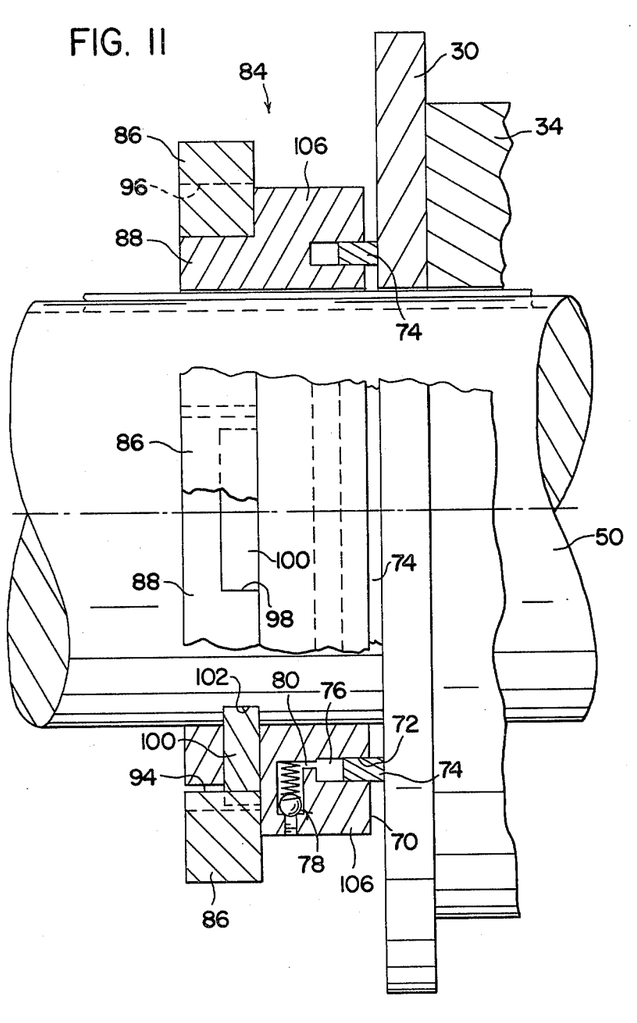
FIG. 11 is a fragmentary view in partial section showing fluid axial thrust means employed in conjunction with the embodiment of the invention shown in FIG. 10; and, FIG. 12 is a fragmentary view in partial section showing mechanical axial thrust means employed in conjunction with the embodiment shown in FIG. 10.
Figure 12:
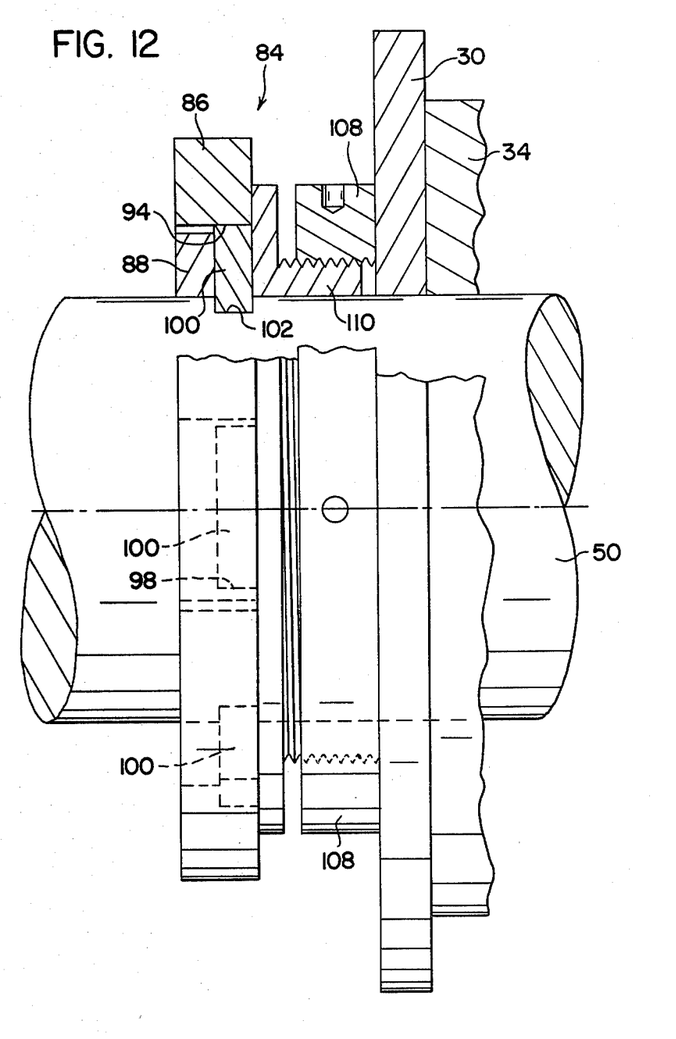

In FIGS. 4–9, the embodiments of the invention therein shown disclose collars 46 and rings 48 in which the interface therebetween is coplanar. In the embodiment of the invention shown in FIG. 10, the interface between collar 86 and ring 88 of clamping collar 84 is concentric between cylindrical surfaces 90 and 92. Cam surfaces 94 are machined in surface 90 of collar 86 adjacent to relief spaces 96, and slots 98 are provided in ring 88 to receive lugs 100. In use, the clamping collar 84 may be pre-assembled before sliding over the end of an arbor 16 or 18. The collar is then positioned on the arbor over arbor slots 102 and collar 84 is arcuately shifted clockwise to drive lugs 100 into clamping engagement with arbor slots 102. Set screws 104 may be employed at this time to lock collar 86 and ring 88 together. To disengage the clamping collar 84 from the arbor 16, set screws 104 are backed off and collar 86 is arcuately shifted counterclockwise to position relief spaces 96 over lugs 100. Collar 86 is then free to be moved axially out of concentric engagement with ring 88, thereby freeing lugs 100 to be removed from arbor slots 102 and ring 88. It is within the contemplation of this embodiment of the invention that clamping collar 84 be provided with fluid pressure or mechanically actuated axial thrust means such as heretofore described in conjunction with FIGS. 7 and 9. Thus, as shown in FIG. 11, the fluid axial thrust means comprises an annular groove 72 machined in face 70 of collar extension 106 of collar 88 in which is fitted an annular piston 74. Fluid pressure is admitted into the chamber 76 formed by annular groove 72 and annular piston 74 by any check valve means such as spring loaded ball means 78 and fluid passage 80. In like manner, the mechanical axial thrust means comprises a peripheral ring 108 in threaded engagement with collar extension 110 of collar 88. The operation of these fluid and mechanical axial thrust devices are the same as those described in FIGS. 7 and 9 respectively.

Apparatus according to the described invention is highly advantageous in the coil slitting art in that it provides means for more quickly setting up coil slitting arbors for slitting operations of relatively short duration and/or operations in which labor costs for set up time must be minimized. The described invention is also advantageous for the reason that large expensive inventories of precision machined spacer sleeves may be reduced or eliminated. Thus, the invention is a saving both in labor costs and machine tool costs for all coil slitting operations whether they be of short duration or prolonged runs.

Although the invention has been described in connection with preferred embodiments of the invention, modifications and other applications of the preferred embodiments of the invention in fields other than the coil slitting art are contemplated to the extent that such modifications and applications are within the scope of the appended claims.

Having thus described my invention, I claim:

1. A shaft clamping collar comprising:
   (a) a first member adapted to encircle a shaft;
   (b) a second member adapted to encircle said shaft and to interface with said first member;
   (c) means to secure said second member to said first member for relative arcuate shifting therebetween;
   (d) lug means positioned between said first and second members; and
   (e) means to radially shift said lug means by arcuately shifting said second member,
   whereby said lug means may be shifted radially to clampingly engage and to disengage said shaft.

2. The device of claim 1, including first guide means mounted on said first member and openings provided in said second member to receive said first guide means therein to support said second member thereon, said openings being configured to permit arcuate shifting of said second member concentric with said first member.

3. The device of claim 1, including cam follower means mounted on said lug means and cam means provided in said second member to drive said cam follower means; said cam means being configured to cam said cam follower means radially when said second member is arcuately shifted.

4. The device of claim 1, including means secured to said first member adapted to apply an axial thrust about the periphery of said shaft.

5. The device of claim 4, wherein said axial thrust means comprises a nut threaded about the periphery of said first member, whereby rotation of said nut causes said nut to shift axially along said shaft.

6. The device of claim 4, wherein said axial thrust means comprise a concentric groove in a face of said first member; a piston slidably fitted in said groove, and means to urge said piston outwardly from said groove.

7. The device of claim 4, wherein said concentric groove is in the face of said first member remote from said second member.

8. The device of claim 4, wherein said means to urge said piston outwardly from said groove is fluid pressure means.

9. A shaft clamping collar comprising:
(a) a first member adapted to encircle a shaft;
(b) a second member adapted to encircle said shaft and to interface with said first member;
(c) means to secure said second member to said first member for relative arcuate shifting therebetween including guide means mounted on said first member and openings provided in said second member to receive said guide means therein to support said second member thereon, said openings being configured to permit arcuate shifting of said second member concentric with said first member;
(d) lug means interfaced between said first and second members;
(e) means to radially shift said lug means by arcuately shifting said second member including cam follower means mounted on said lug means and cam means provided in said second member to receive said cam follower means therein, said cam means being configured to shift said cam follower means and said lug means to clamp or de-clamp said shaft when said second member is arcuately shifted; and
(f) means secured to said first member adapted to exert an axial thrust about the periphery of said shaft against an object mounted on said shaft.

10. The device of claim 9, wherein said axial thrust means comprises a concentric groove in a face of said first member; a piston slidably fitted in said groove, and means to urge said piston outwardly from said groove.

11. The device of claim 9, wherein said axial thrust means comprises a nut threaded about the periphery of said first member, whereby rotation of said nut causes said nut to shift axially along said shaft.

12. The device of claim 9, wherein said guide means comprise pins mounted about the periphery of said first member in axial alignment with said shaft and said openings in said second member comprising arcuate slots concentric with said shaft, wherein said pins and said slots maintain said first and second members in concentric alignment about said shaft and permit arcuate shifting between said first and second members.

13. The device of claim 9, wherein said cam follower means comprise pins mounted on said lug means in axial alignment with said shaft and said cam means in said second member comprise slots inclined out of concentricity with said shaft to shift said pins upon arcuate shifting of said first and second members.

14. The device of claim 9 in combination with a shaft having a groove on said shaft to locate and to receive pressure engagement from said lug means.

15. The device of claim 14, wherein said groove is transverse to the axis of said shaft.

16. The device of claim 14, including additional grooves intermittently concentrically encircling said shaft.

17. The device of claim 14, wherein said groove concentrically encircles said shaft.

18. The device of claim 14, wherein said groove is spiral.

19. The device of claim 14, wherein said groove spirally encircles said shaft.

20. The device of claim 14, wherein said groove spirally encircles said shaft along its entire length.

21. The device of claim 1, wherein said first and second members are concentric.

22. The device of claim 1, wherein said first and second members are concentric with said first member arcuately shiftable relative to said second member; a cam surface on the interior face of said first member; a through slot between the exterior and interior faces of said second member; a shaft clamping lug adapted to slidably fit within said through slot having a cam follower surface adapted to engage said cam surface, said cam surface being shaped to urge said clamping lug radially inwardly when said first member is arcuately shifted in a first direction, whereby said clamping lug is moveable into clamping engagement with a shaft.

23. The device of claim 22, including means to lock said first member against arcuate shifting relative to said second member.

24. The device of claim 22, including lug clearance space provided on the interior face of said first member into which the cam surface engaging portion of said clamping lug can be shifted when said first member is arcuately shifted in a second direction, whereby said clamping lug may be disengaged from said shaft and said first member may be disengaged from said second member by axially shifting said first member.

25. The device of claim 22, including means to lock said second member against arcuate movement about said shaft and means to lock said first member against axial and arcuate movement relative to said first member.

26. The device of claim 22, including in combination a shaft having lug receiving slots formed on the periphery of said shaft, said slots being axially spaced along said shaft and adapted to receive therein one end of said clamping lug in clamping engagement between said shaft and said first and second members.

27. The device of claim 22, including means secured to said clamping collar adapted to apply an axial thrust about the periphery of said shaft.

28. The device of claim 22, including means secured to said second member adapted to apply an axial thrust about the periphery of said shaft.

29. The device of claim 22, including fluid pressure means secured to said second member adapted to apply an axial thrust about the periphery of said shaft.

30. The device of claim 22, including a threaded nut about the periphery of said second member, whereby rotation of said nut causes said nut to shift axially along said shaft to apply axial thrust.

* * * * *

UNITED STATES PATENT AND TRADEMARK OFFICE
CERTIFICATE OF CORRECTION

PATENT NO.   : 4,220,064
DATED        : September 2, 1980
INVENTOR(S)  : Robert Potter It is certified that error appears in the above-identified patent and that said Letters Patent are hereby corrected as shown below:

Column 3, line 15, "or" should read -- of --; line 63, "eliminted" should read -- eliminated --. Column 5, line 5, "or" should read -- of --; line 67, "collar" should read -- ring --. Column 6, line 5, "collar" (second occurrence) should read -- ring --; line 66, "claim 4" should read -- claim 6 --. Column 7, line 1, "claim 4" should read -- claim 6 --.

Signed and Sealed this

Seventh Day of April 1981

[SEAL]

Attest:

RENE D. TEGTMEYER

Attesting Officer    Acting Commissioner of Patents and Trademarks